O. B. Latham,
Well Drill and Reamer.
N° 49,123.  Patented Aug. 1, 1865.

Witnesses:

Inventor:

UNITED STATES PATENT OFFICE.

O. B. LATHAM, OF SENECA FALLS, NEW YORK.

IMPROVEMENT IN DRILLS FOR WELL-BORING.

Specification forming part of Letters Patent No. 49,123, dated August 1, 1865.

*To all whom it may concern:*

Be it known that I, O. B. LATHAM, of Seneca Falls, in the county of Seneca and State of New York, have invented certain new and useful Improvements in a Combined Drill and Reamer for Sinking Wells, &c.; and I do hereby declare that the following is a full and complete description of the construction and operation of the same, reference being had to the accompanying drawings, making a part of this specification, in which—

Figure 1:
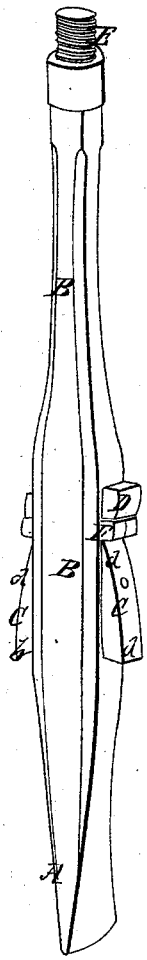
Figure 2:
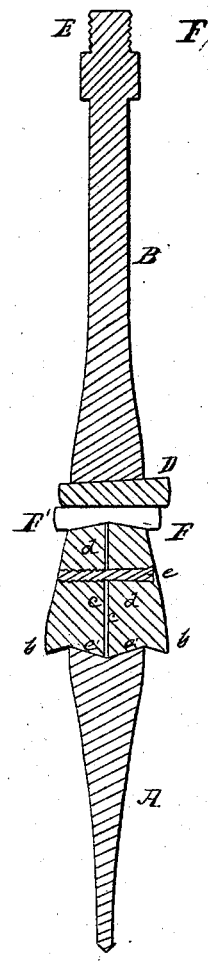
Figure 3:
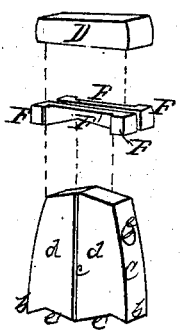

Figure 1 is a perspective view of the reamer and drill combined. Fig. 2 is a vertical section of the same. Fig. 3 represents detached parts that will be referred to in the description.

Similar letters of reference denote like parts in the views.

My improvement relates to a reamer and drill combined in one tool, whereby the well is drilled and reamed out at the same time with one operation.

In Figs. 1 and 2, A represents the drill, which may be of the usual form. The shank B of the reamer and drill is enlarged at B', through which there is a slot that the reamer C is secured in by means of a key, D, and gibs F. The manner in which the reamer, gibs, and key are formed and secured in place is shown in Figs. 2 and 3, Fig. 3 being a perspective view of each of them detached from the drill and from each other, the dotted lines indicating the manner in which they come together.

The reamer is made in two parts or sections, $d\ d$, between which one or more thin metallic plates can be placed, as seen at $c$, whereby the reamer can be expanded or contracted to cut a wide or narrow opening, as may be desired. The sections and plates are held together by a screw, $e$, through the center, as represented. The reamer is pointed at the lower end in the center, the inclined sides or planes $e'$ fitting down into the shank, which is beveled out in a similar manner, forming a dovetail. The lower edges, $b\ b$, of the sides of the reamer that project outside of the shank (formed as represented) are the cutting-edges. The reamer is inclined upward toward the center at the top, that the gibs F, being of the same shape on the underside, fit down on. The reamer, being thus formed above and below, when adjusted into place, is held securely and immovably in the shank.

The gibs F, of which there can be one or more, fitting down on the reamer, are formed with a head, F', on each end that projects out on each side of the slot, which, together with the reamer, being inclined upward, prevents any lateral movement of the gibs and holds the upper end of the reamer as firm as the lower end. The key D, tapering toward one end, when driven in above the gibs, retains the reamer firmly in place. By removing the key and taking out or slipping up the gibs the reamer can readily be removed from the shank for the purpose of adjusting it, making it wider or narrower, as may be desired, or for any other object.

The reamer, in place of being secured in the shank by gibs and a key, can be fastened by means of a set-screw.

On the top of the shank B, at E, is screwed the drill-shaft, whereby the drill and reamer are operated.

In using this drill and reamer, as the well is bored out by the drill being turned round and round, the reamer, turning in the same manner, reams out the well above the drill, and the reamer can be adjusted, as before stated, to ream out an opening of any diameter that may be desired.

In boring through rocks there are often fissures or crevices running in an inclined direction from the drill, and in endeavoring to drill across them without the reamer the drill is liable to take more or less the direction of the fissure and not bore straight down, but by means of the drill combined with the reamer, as herein described, the reamer, being above the drill in the well, retains the drill in a directly vertical position, whatever may be the direction of the crevice.

It is found in practice that the cutting-edges $b$ of the reamer are self-sharpening.

What I claim as my improvement, and desire to secure by Letters Patent, is—

The adjustable reamer C, in two sections, the screw $e$, plates $c$, the key, and gibs, in combination with the drill and shank, arranged and operating conjointly, substantially as and for the purpose set forth.

O. B. LATHAM.

Witnesses:
W. H. BURRIDGE,
A. W. McCLELLAN.